United States Patent
Boehm et al.

(10) Patent No.: US 11,420,605 B2
(45) Date of Patent: Aug. 23, 2022

(54) ELECTROMECHANICAL BRAKE PRESSURE GENERATOR FOR A HYDRAULIC BRAKING SYSTEM OF A VEHICLE AND VEHICLE INCLUDING AN ELECTROMECHANICAL BRAKE PRESSURE GENERATOR

(71) Applicant: Robert Bosch GmbH, Stuttgart (DE)

(72) Inventors: Mark Boehm, Lehrensteinsfeld (DE); Claus Oehler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 16/852,921

(22) Filed: Apr. 20, 2020

(65) Prior Publication Data
US 2020/0339090 A1 Oct. 29, 2020

(30) Foreign Application Priority Data
Apr. 25, 2019 (DE) .......................... 102019205972.4

(51) Int. Cl.
*B60T 13/74* (2006.01)
*B60T 13/16* (2006.01)
(Continued)

(52) U.S. Cl.
CPC .......... *B60T 13/745* (2013.01); *B60T 13/161* (2013.01); *B60T 17/08* (2013.01); *F16H 25/20* (2013.01);
(Continued)

(58) Field of Classification Search
CPC ...... B60T 13/745; B60T 13/161; B60T 17/08; F16H 25/20; F16H 2025/2046; F16H 2025/2081
See application file for complete search history.

(56) References Cited

U.S. PATENT DOCUMENTS

| 122,062 | A | * | 12/1871 | Rohrer | .................... | A01D 57/02 |
| | | | | | | 56/169 |
| 4,395,883 | A | * | 8/1983 | Melinat | .................... | B60T 7/042 |
| | | | | | | 60/545 |

(Continued)

FOREIGN PATENT DOCUMENTS

WO 2017045804 A1 3/2017

*Primary Examiner* — Robert A. Siconolfi
*Assistant Examiner* — James K Hsiao
(74) *Attorney, Agent, or Firm* — Norton Rose Fulbright US LLP; Gerard Messina

(57) ABSTRACT

An electromechanical brake pressure generator for a hydraulic braking system of a vehicle. The electromechanical brake pressure generator includes at least one threaded drive system for converting a drive-side rotary motion into a translatory motion for the brake pressure generation. The threaded drive system includes a rotatable spindle nut, and a spindle cooperating with a thread of the spindle nut so that the spindle is axially displaceable with a rotation of the spindle nut. The threaded drive system includes a drive wheel, which is non-rotatably situated on the spindle nut and via which the spindle nut is connected to the electric motor, the drive wheel and the spindle nut being designed as separate plastic components, including a plurality of mutually corresponding connecting structures which, in the assembled state, engage one another in a form-locked manner in such a way that a torque required for rotating the spindle nut is transmittable.

7 Claims, 3 Drawing Sheets

(51) Int. Cl.
  *F16H 25/20* (2006.01)
  *B60T 17/08* (2006.01)
(52) U.S. Cl.
  CPC .............. *F16H 2025/2046* (2013.01); *F16H 2025/2081* (2013.01)

(56) References Cited

U.S. PATENT DOCUMENTS

| | | | | |
|---|---|---|---|---|
| 4,674,018 A * | 6/1987 | Ryder | | F16H 25/20 362/424 |
| 5,892,309 A * | 4/1999 | Dreher | | H02K 7/116 310/80 |
| 6,116,103 A * | 9/2000 | Heckel, Jr. | | F16H 25/20 188/69 |
| 6,250,170 B1 * | 6/2001 | Hill | | F16H 25/20 74/89.23 |
| 6,305,508 B1 * | 10/2001 | Schumann | | B60T 13/741 188/72.8 |
| 6,773,153 B2 * | 8/2004 | Burton | | B60Q 1/0686 362/531 |
| 6,810,985 B1 * | 11/2004 | Budaker | | F16H 13/02 74/424.81 |
| 7,824,087 B2 * | 11/2010 | Gattone | | B60Q 1/0683 362/523 |
| 8,499,653 B1 * | 8/2013 | Sheahan, Jr. | | F16H 25/20 74/424.78 |
| 9,371,901 B2 * | 6/2016 | Jung | | F16H 55/171 |
| 9,605,736 B1 * | 3/2017 | Foshage | | F16H 25/20 |
| 9,920,821 B2 * | 3/2018 | Wu | | F16H 25/20 |
| 10,119,600 B2 * | 11/2018 | Urban | | B23C 3/28 |
| 10,543,825 B2 * | 1/2020 | Deberling | | B60T 13/745 |
| 10,604,133 B2 * | 3/2020 | Deberling | | F16H 25/20 |
| 10,995,832 B2 * | 5/2021 | Shimizu | | H02K 7/116 |
| 11,054,007 B2 * | 7/2021 | Shin | | F16H 25/2006 |
| 2010/0026083 A1 * | 2/2010 | Leiber | | B60T 7/042 303/3 |
| 2010/0083793 A1 * | 4/2010 | Ko | | F16H 25/20 74/640 |
| 2012/0090316 A1 * | 4/2012 | Philippe | | B60T 13/745 60/545 |
| 2012/0222509 A1 * | 9/2012 | Winther | | F16H 25/20 74/89 |
| 2012/0222510 A1 * | 9/2012 | Winther | | F16H 25/20 74/89.37 |
| 2014/0090371 A1 * | 4/2014 | Yoshizu | | B60T 13/745 60/545 |
| 2014/0202271 A1 * | 7/2014 | Oberndorfer | | F16H 25/20 74/89.37 |
| 2015/0101428 A1 * | 4/2015 | Mizuuchi | | F16H 57/029 74/89.23 |
| 2015/0342809 A1 * | 12/2015 | Doppler | | F16H 55/06 5/611 |
| 2015/0377329 A1 * | 12/2015 | Wu | | F16H 25/20 74/89.23 |
| 2016/0068147 A1 * | 3/2016 | Hatt | | F16H 25/24 74/409 |
| 2017/0097071 A1 * | 4/2017 | Galehr | | F16H 25/24 |
| 2017/0137005 A1 * | 5/2017 | Weh | | F04B 23/025 |
| 2017/0145727 A1 * | 5/2017 | Yamagata | | E05F 15/60 |
| 2018/0251114 A1 * | 9/2018 | Deberling | | F16H 25/2018 |
| 2018/0251115 A1 * | 9/2018 | Nagel | | B60T 17/221 |
| 2018/0257624 A1 * | 9/2018 | Deberling | | F16H 25/24 |
| 2018/0304876 A1 * | 10/2018 | Ohm | | B60T 8/4077 |
| 2018/0345939 A1 * | 12/2018 | Schmitt | | B60T 13/745 |
| 2019/0047532 A1 * | 2/2019 | Ohm | | F16H 25/2003 |
| 2020/0072308 A1 * | 3/2020 | Kocjan | | B60T 17/083 |
| 2020/0189549 A1 * | 6/2020 | Mazzarini | | F16D 65/22 |
| 2021/0197784 A1 * | 7/2021 | Drumm | | F16H 25/2015 |

* cited by examiner

ELECTROMECHANICAL BRAKE PRESSURE GENERATOR FOR A HYDRAULIC BRAKING SYSTEM OF A VEHICLE AND VEHICLE INCLUDING AN ELECTROMECHANICAL BRAKE PRESSURE GENERATOR

CROSS REFERENCE

The present application claims the benefit under 35 U.S.C. § 119 of German Patent Application No. DE 102019205972.4 filed on Apr. 25, 2019, which is expressly incorporated herein by reference.

FIELD

The present invention relates to an electromechanical brake pressure generator for a hydraulic braking system of a vehicle and to a vehicle including an electromechanical brake pressure generator.

The electromechanical brake pressure generator includes, in particular, a threaded drive system for converting a drive-side rotary motion into a translatory motion for the brake pressure generation.

BACKGROUND INFORMATION

The foot force of the driver is mostly not sufficient for braking motor vehicles, so that these are usually equipped with a brake booster. Conventional brake boosters in general operate with the aid of a vacuum generated by the internal combustion engine. The pressure difference between the engine pressure and the ambient pressure is used in the process to apply a boosting force onto the piston rod of the piston/cylinder unit, in addition to the foot force of the driver.

Alternative brake pressure buildup devices are needed for future drive concepts of motor vehicles since a vacuum is no longer available to operate a conventional vacuum brake booster. For this purpose, the electromechanical brake pressure generators of interest here were developed.

The actuating force is generated in the process at the piston/cylinder unit with the aid of an electric motor. Such electromechanical brake pressure generators may not only be used to provide an auxiliary force, but in brake by wire systems also to single-handedly provide the actuating force. Electromechanical brake pressure generators are thus of advantage, in particular, with respect to autonomous driving.

A conventional electromechanical brake booster is described in PCT Application No. WO 2017/045804 A1, which is shown in FIG. 1. In contrast, the present invention is directed to an electromechanical brake pressure generator, which is able to apply a braking force independently of an actuation of the brake pedal. The conventional brake booster 1 includes a spindle nut 2 and an electric motor (not shown) with the aid of which spindle nut 2 may be made to carry out a rotation via a spur gear 3. Spindle nut 2 is operatively engaged with a spindle 4, which is why spindle 4 may be made to carry out a translatory motion along its spindle axis 5 with the aid of spindle nut 2 made to carry out the rotation. To prevent spindle 4 from co-rotating as a result of the rotation of spindle nut 2, brake booster 1 includes a bearing system 6 to which spindle 4 is fixedly connected.

Bearing system 6 includes a bracket 6a, on the edges of which two sliding bearings 6b are situated. Sliding bearings 6b run on tie rods 7 which extend essentially in parallel to spindle axis 5. Spindle 4 is movable in the axial direction with the aid of this bearing system 6 and is secured against twisting.

It is an object of the present invention to provide an electromechanical brake pressure generator including a threaded drive system which is manufacturable more easily and more economically.

SUMMARY

The object may achieved by an example embodiment of an electromechanical brake pressure generator for a hydraulic braking system in accordance with the present invention. Advantageous refinements of the present invention are described herein.

The present invention provides an electromechanical brake pressure generator for a hydraulic braking system of a vehicle. An example embodiment of the electromechanical brake pressure generator in accordance with the present invention includes at least one threaded drive system for converting a drive-side rotary motion into a translatory motion for the brake pressure generation. The threaded drive system includes a spindle nut, which is rotatable with the aid of an electric motor, and a spindle cooperating with a thread of the spindle nut so that the spindle is axially displaceable with a rotation of the spindle nut.

A threaded drive system within the scope of the present invention shall be understood to mean both a pure spindle drive, in which the spindle nut is in direct contact with the spindle, and a ball screw. A ball screw is a helical gear including balls inserted between the spindle and the spindle nut. Both parts have a helical groove, which together form a helical tube filled with balls. The form-locked connection in the thread transversely to the helical line does not take place between the thread groove and tongue, as is the case with the pure spindle drive, but with the aid of balls.

The threaded drive system furthermore includes a drive wheel, which is non-rotatably situated on the spindle nut and with the aid of which the spindle nut is connected to the electric motor, the drive wheel and the spindle nut being designed as separate plastic components including a plurality of mutually corresponding connecting structures, which engage one another in a form-locked manner in such a way that a torque required for rotating the spindle nut, and optionally also a force, is transmittable in at least one axial direction. The latter may possibly only be notable, for example, in the case of a helical cut drive wheel having a corresponding axial force component.

By arranging the drive wheel and the spindle nut separately, it is possible to introduce additional components which have to be installed upstream of the drive wheel during assembly. Accordingly, the drive wheel and the spindle nut have to be non-rotatably connected to one another. A non-rotatable arrangement shall be understood to mean that no rotation of the arranged components relative to one another takes places. As a result, the spindle nut may be rotated by the drive wheel. The drive wheel also should not be movable in an axial direction. The drive wheel is therefore preferably axially fixed on the spindle nut.

Connecting structures are thus used for the non-rotatable connection. Connecting structures shall be understood to mean the moldings of these components which are designed to connect at least two components and necessary to connect these components. Each of the connecting structures may have a shape with the aid of which a form-locked connection is created. In particular, the shape and the number of the connecting structures are selected in such a way that a torque required for rotating the spindle nut is transmittable.

The use of plastic components has the advantage that these may be easily manufactured by way of injection molding. In addition, these components are lighter and, due to the low costs of plastic, less expensive. Such an electromechanical brake pressure generator may thus be manufactured more easily and more economically.

In one preferred embodiment of the present invention, the drive wheel is situated on a spindle nut end. The spindle nut end denotes an outer axial area of the spindle nut. This allows the drive wheel to be easily installed on the spindle nut from the spindle nut end. In addition, for example, recesses may be introduced more easily from the spindle nut end.

In one further preferred embodiment of the present invention, the connecting structures are formed by recesses and protrusions, which engage one another in a form-locked manner. Within the meaning of the present invention, recesses shall be understood to mean material cut-outs which deviate from the customary shape of the body to form the connecting structures. The recesses may be formed both only in a portion of the component depth, and penetrate the entire component depth.

Accordingly, the protrusions are elements of a component which protrude from the customary shape of the body to form the connecting structure. Accordingly, the protrusions fit into the recesses in a form-locked manner. In this way, a form-locked connection may be created between the recesses and the protrusions so that sufficient torque is transmittable.

The recesses are preferably situated on the side of the spindle nut. As a result, no parts protrude from the spindle nut, so that components, such as a bearing, may be installed more easily prior to the assembly of the drive wheel. The recess areas are, in particular, smaller than the areas situated between the recesses. In this way, in particular, a sufficient holding force of the areas situated between the recesses may be ensured.

In one advantageous refinement, the protrusions have a rectangular cross section. In the case of the rectangular cross section, the protrusions have a constant thickness across the length. In this way, it is possible to create the protrusions without making undercuts necessary. This allows such protrusions to be created easily and economically.

The drive wheel is preferably axially fixed on the spindle nut with the aid of hot caulking. Hot caulking is a production process which creates permanent form-locked, form-fit and partially, beyond that, integral joints. During hot caulking, plastic is melted and formed, using force and heat. Preferably, thermoplastic polymers are hot caulked.

In addition to fixing the components with respect to one another, this joining technique also allows forces and/or torques to be transmitted between the individual parts. Accordingly, the drive wheel is fixed on the spindle nut in a force-fit manner.

The spindle nut and the drive wheel are advantageously made of different plastic materials. In this way, it is possible to select plastic materials for the drive wheel and the spindle nut which are optimally designed for the different tasks and the consequently required properties of the plastic. Preferably, for example, thermoplastic polymers such as polyamide (PA), polyoxymethylene (POM) and/or polyether ether ketone (PEEK) are used. As an alternative, it is also possible to use polybutylene terephthalate (PBT), polycarbonate (PC), polyethylene (PE) and/or polypropylene (PP).

The present invention furthermore provides a vehicle including an example electromechanical brake pressure generator for a hydraulic braking system. Such a vehicle allows the advantages described with respect to the electromechanical brake pressure generator to be achieved. In one preferred embodiment, this vehicle may be an automated or completely autonomous vehicle.

Exemplary embodiments of the present invention are shown in the figures and are described in greater detail below.

DETAILED DESCRIPTION OF EXAMPLE EMBODIMENTS

Figure 1:
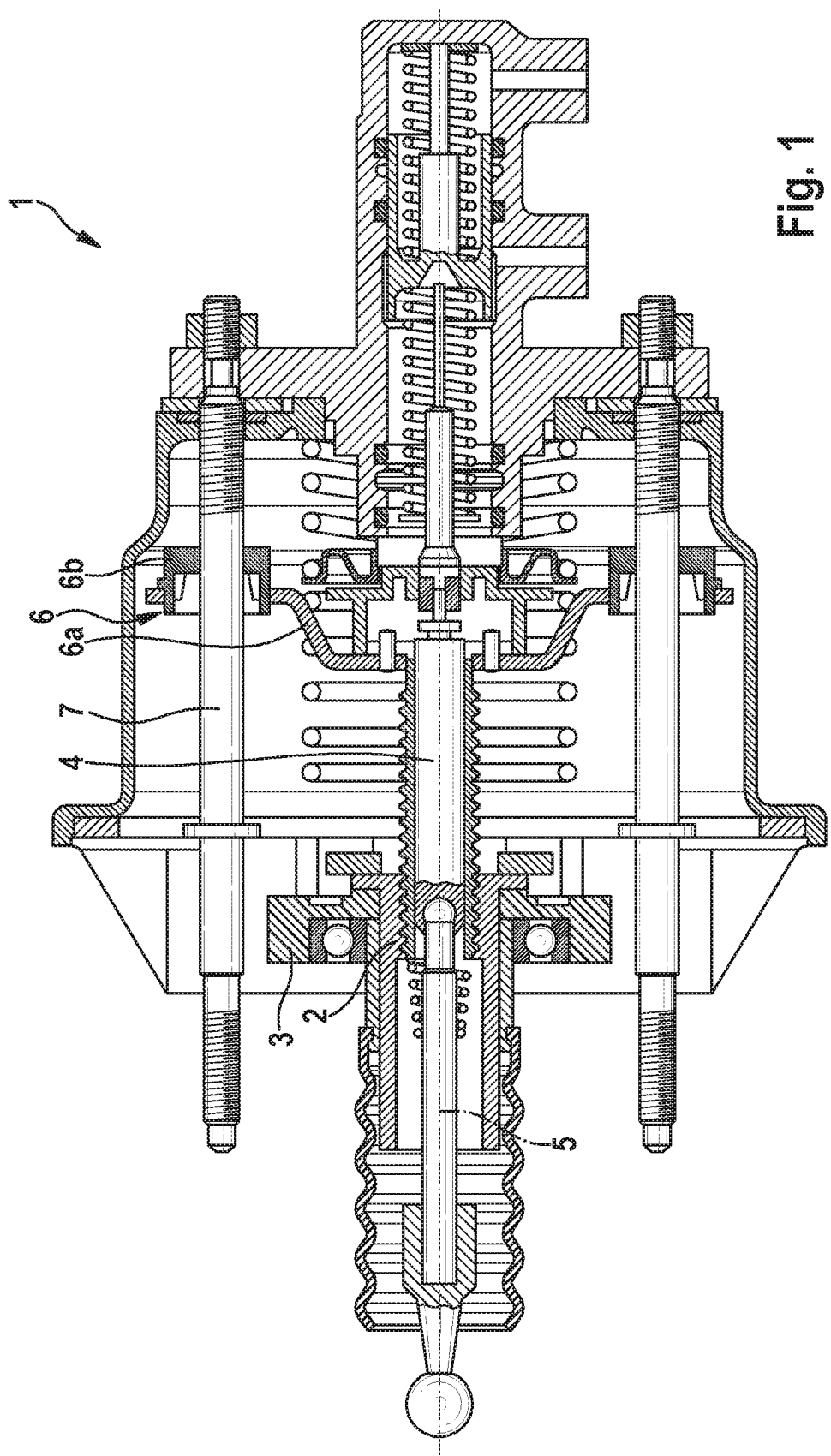
FIG. 1 shows an illustration of a conventional electromechanical brake booster from the related art.
Figure 2:
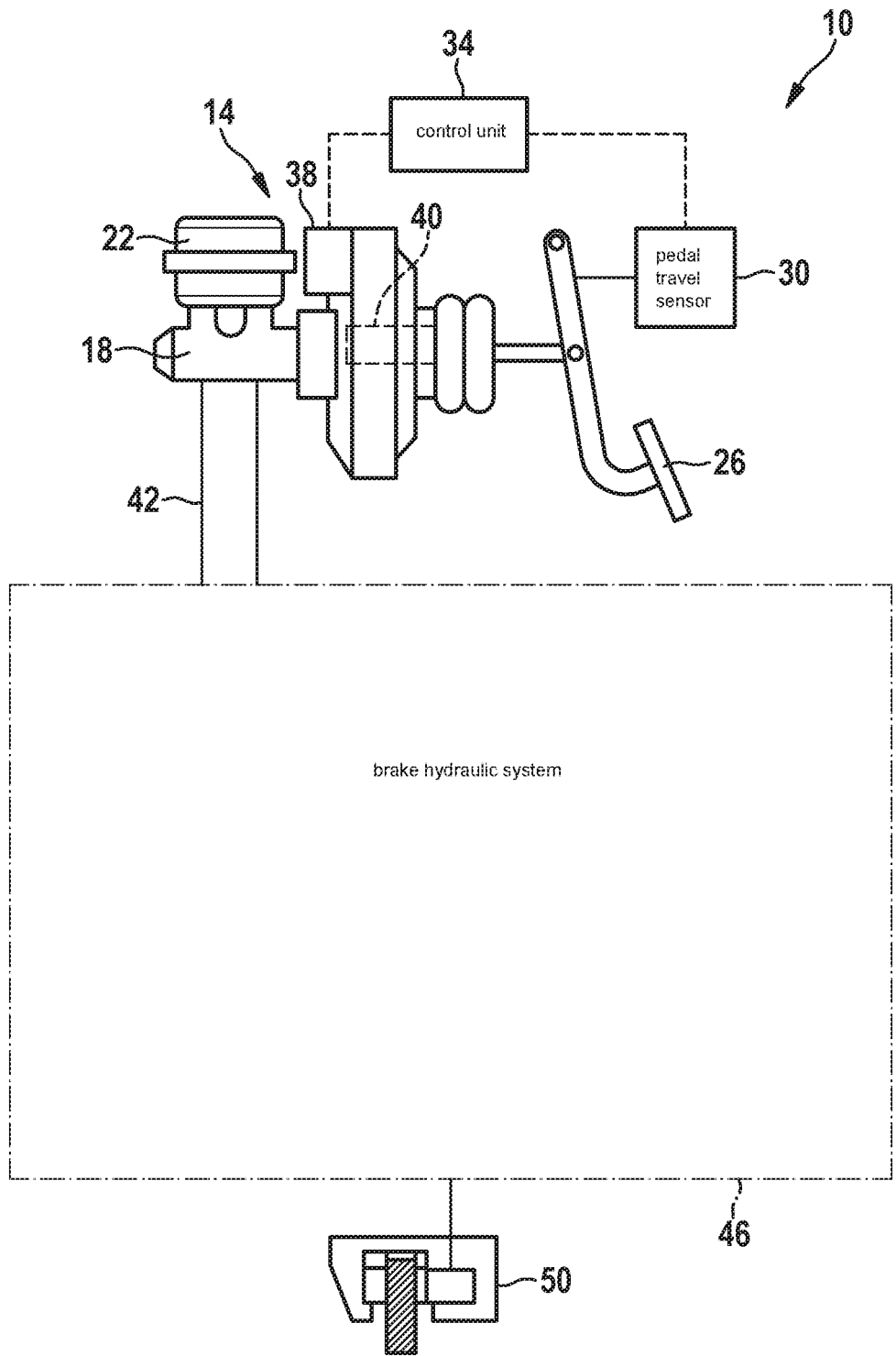
FIG. 2 shows a schematic illustration of a hydraulic braking system for a vehicle including an electromechanical brake pressure generator.

FIG. 2 shows a schematic illustration of a hydraulic braking system 10 for a vehicle including an electromechanical brake pressure generator 14. Hydraulic braking system 10 includes electromechanical brake pressure generator 14. This brake pressure generator 14 includes a piston/cylinder unit 18 which is supplied with brake fluid via a brake fluid reservoir 22.

Piston/cylinder unit 18 may be activated by a brake pedal 26 actuated by the driver, and the resulting brake pedal travel is measured by a pedal travel sensor 30 and forwarded to a control unit 34. Even though FIG. 2, in principle, shows a brake booster, it is essential here that the brake pedal travel is measured by pedal travel sensor 30. A brake pressure generation without a brake pedal travel is also possible, so that the vehicle is also brakable in the autonomous driving state.

Based on the measured brake pedal travel, control unit 34 generates a control signal for an electric motor 38 of brake pressure generator 14. Electric motor 38, which is connected to a gearbox (not shown) of brake pressure generator 14, boosts the braking force input by brake pedal 26 in accordance with the control signal. For this purpose, a threaded drive system 40 situated in brake pressure generator 14 is activated by electric motor 38 in accordance with the actuation of brake pedal 26 so that the rotary motion of electric motor 38 is converted into a translatory motion.

With the aid of brake pressure generator 14, the brake fluid present in piston/cylinder unit 18 is pressurized by the actuation of brake pedal 26. This brake pressure is forwarded to a brake hydraulic system 46 via brake lines 42. Brake hydraulic system 46, which is only shown as a box here, is formed by various valves and other components for forming a, for example, electronic stability program (ESP). Brake hydraulic system 46 is additionally connected to at least one wheel brake unit 50 so that a braking force may be applied to wheel brake unit 50 by a corresponding switching of valves.

Figure 3:
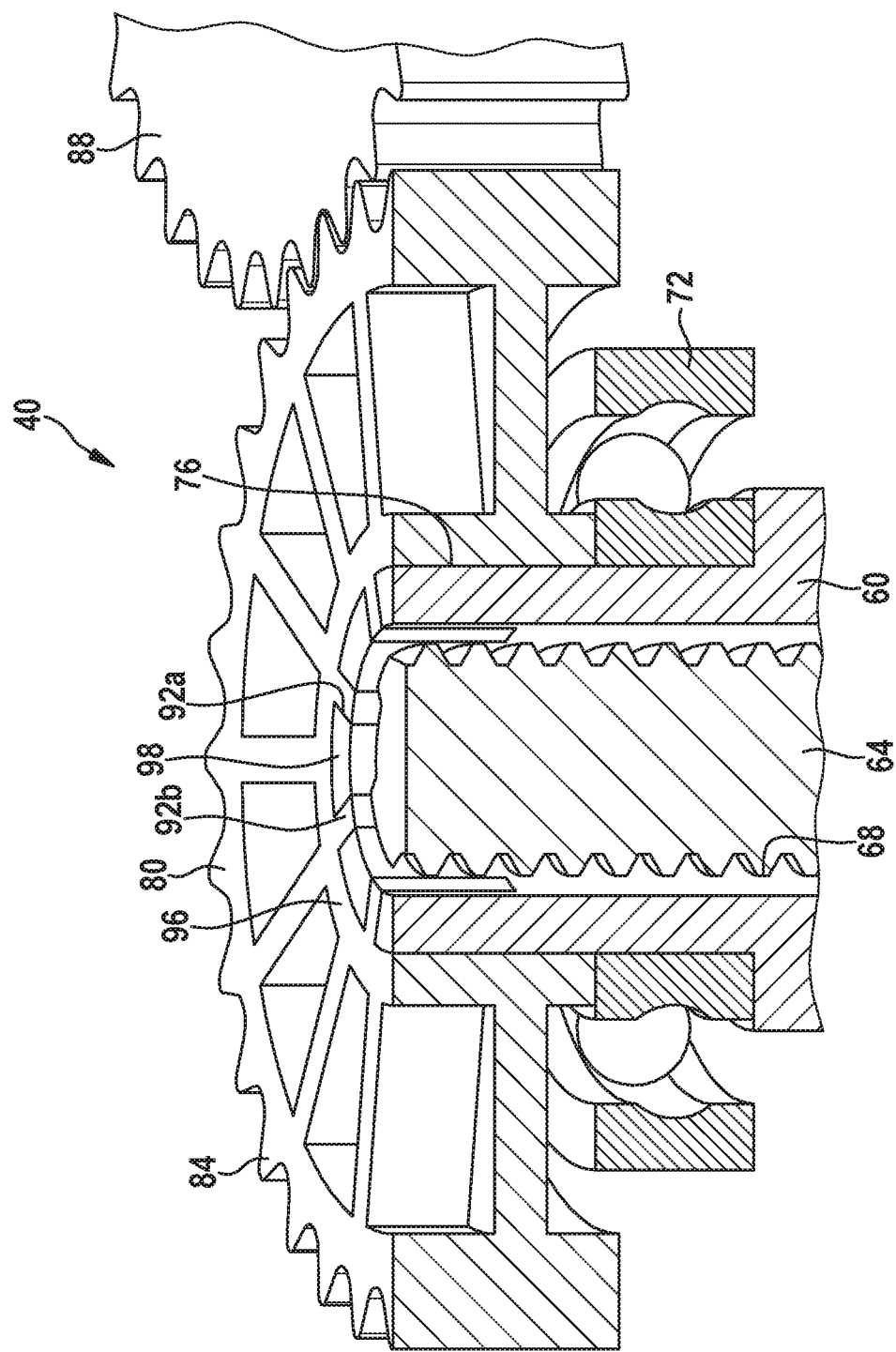
FIG. 3 shows a perspective sectional view of one exemplary embodiment of a threaded drive system according to the present invention of the electromechanical brake pressure generator.

A perspective sectional view of one exemplary embodiment of threaded drive system 40 according to the present invention of electromechanical brake pressure generator 14 is shown in FIG. 3. This threaded drive system 40 includes a spindle nut 60, which surrounds a section of a spindle 64. Spindle 64 is in engagement with a thread 68 of spindle nut 60. Threaded drive system 40 additionally includes a bearing 72 designed as a rolling bearing, which surrounds spindle nut 60 on the outside and with the aid of which spindle nut 60 is mounted.

A drive wheel 80 is non-rotatably connected to spindle nut 60 on one spindle nut end 76. This drive wheel 80 includes outer teeth 84 with the aid of which it is operatively connected to a gearbox 88. Gearbox 88 is connected to electric motor 38 shown in FIG. 2, so that drive wheel 80 is drivable by electric motor 38 with the aid of gearbox 88. Spindle nut 60 is rotatable by the driven drive wheel 80. Spindle nut 60 is thus made to carry out a rotary motion by electric motor 38 and thereby displaces spindle nut 60 cooperating with thread 68 in an axial direction.

In this exemplary embodiment, spindle nut 60 and drive wheel 80 are designed as individual plastic components. As a result, drive wheel 80 has to be connected to spindle nut 60. Spindle nut 60 and drive wheel 80 thus include a plurality of connecting structures 92a, 92b, which may be connected to one another in a form-locked manner. In this exemplary embodiment, connecting structures 92a, 92b are implemented as recesses 92a and protrusions 92b, protrusions 92b engaging in recesses 92a in a form-locked manner.

In this exemplary embodiment, recesses 92a are situated on spindle nut 60, and protrusions 92b are situated on drive wheel 80 and point radially inwardly from an inner ring 96 of drive wheel 80. In particular, protrusions 92b have a rectangular cross section. When drive wheel 80 is connected to spindle nut 60, drive wheel 80 is pushed by spindle nut end 76 with the aid of protrusions 92b into recesses 92a. A hot caulking 98 is formed at spindle nut end 76 for axially attaching drive wheel 80 to spindle nut 60. Drive wheel 80 is thereby attached to spindle nut 60, so that a torque for rotating spindle nut 60 is transmittable.

What is claimed is:

1. An electromechanical brake pressure generator for a hydraulic braking system of a vehicle, comprising:
   at least one threaded drive system configured to convert a drive-side rotary motion into a translatory motion; and
   a piston/cylinder unit actuatable by the threaded drive system for brake pressure generation;
   wherein the threaded drive system includes:
      a spindle nut which is rotatable via an electric motor;
      a spindle cooperating with a thread of the spindle nut so that the spindle is axially displaced with a rotation of the spindle nut; and
      a drive wheel which is non-rotatably situated at the spindle nut, and via which the spindle nut is connected to the electric motor, wherein the drive wheel and the spindle nut are separate plastic components, including a plurality of mutually corresponding connecting structures which, in an assembled state, engage one another in a form-locked manner in such a way that a torque required for rotating the spindle nut is transmitted;
   wherein the drive wheel is axially fixed on the spindle nut via a hot caulking.

2. The electromechanical brake pressure generator as recited in claim 1, wherein the drive wheel is situated at a spindle nut end.

3. The electromechanical brake pressure generator as recited in claim 1, wherein the connecting structures are formed by recesses and protrusions, which engage one another in a form-locked manner.

4. The electromechanical brake pressure generator as recited in claim 3, wherein the recesses are situated on a side of the spindle nut.

5. The electromechanical brake pressure generator as recited in claim 3, wherein the protrusions have a rectangular cross section.

6. The electromechanical brake pressure generator as recited in claim 1, wherein the spindle nut and the drive wheel are made of different plastic materials.

7. A vehicle, comprising:
   a hydraulic braking system; and
   an electromechanical brake pressure generator for the hydraulic braking system, the electromechanical brake pressure generator including:
      at least one threaded drive system configured to convert a drive-side rotary motion into a translatory motion; and
      a piston/cylinder unit actuatable by the threaded drive system for brake pressure generation;
      wherein the threaded drive system includes:
         a spindle nut which is rotatable via an electric motor;
         a spindle cooperating with a thread of the spindle nut so that the spindle is axially displaced with a rotation of the spindle nut; and
         a drive wheel which is non-rotatably situated at the spindle nut, and via which the spindle nut is connected to the electric motor, wherein the drive wheel and the spindle nut are separate plastic components, including a plurality of mutually corresponding connecting structures which, in an assembled state, engage one another in a form-locked manner in such a way that a torque required for rotating the spindle nut is transmitted;
      wherein the drive wheel is axially fixed on the spindle nut via a hot caulking.

* * * * *